INVENTOR.
ERNST W. ALLARDT

BY

ATTORNEY

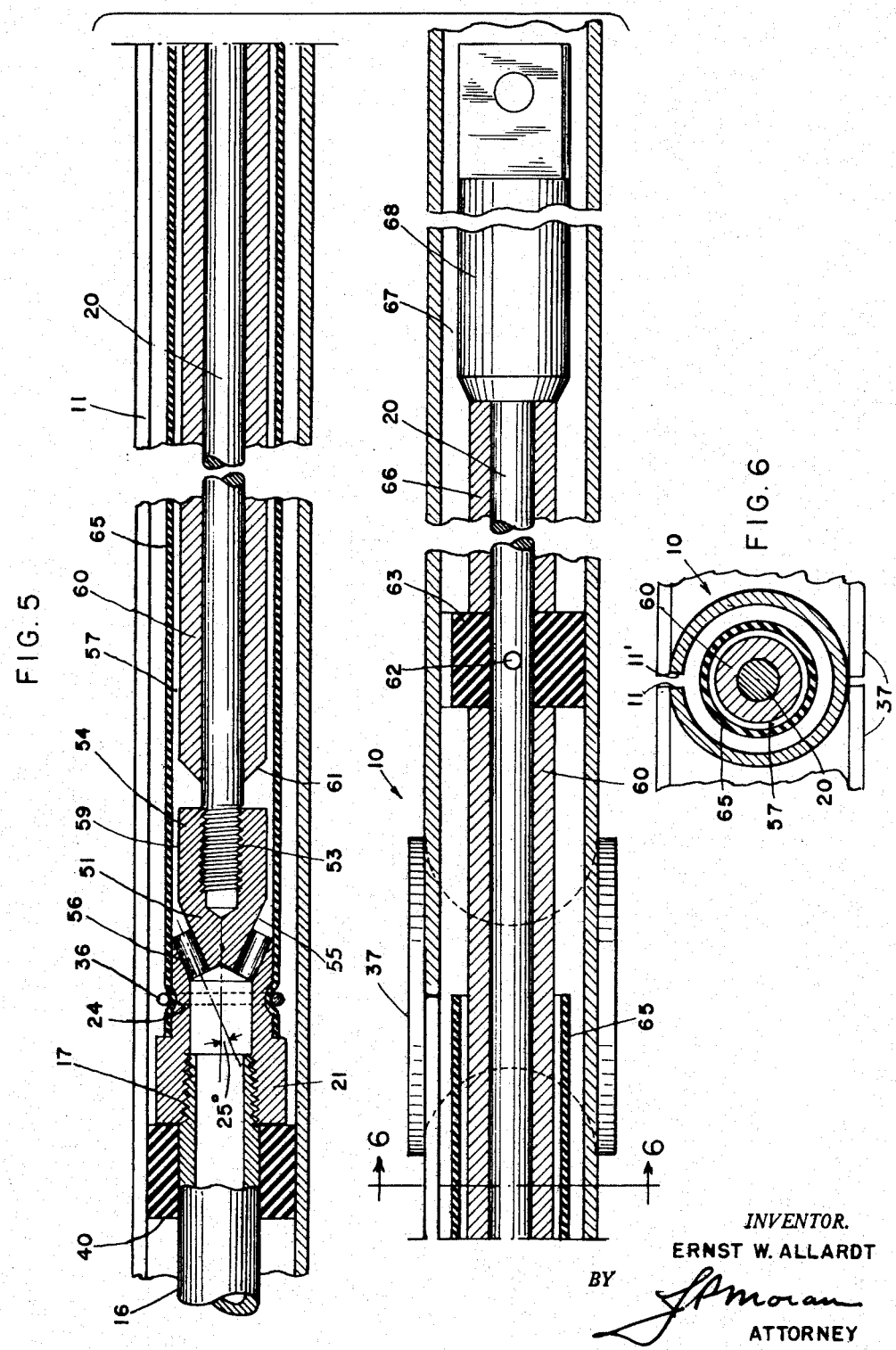

United States Patent Office 3,004,134
Patented Oct. 10, 1961

3,004,134
IMPEDOR FOR USE ON A THERMATOOL WELDER
Ernst W. Allardt, Alliance, Ohio, assignor to The Babcock & Wilcox Company, New York, N.Y., a corporation of New Jersey
Filed July 17, 1959, Ser. No. 827,755
6 Claims. (Cl. 219—59)

This invention relates to the manufacture of electric resistance welded tubing using high frequency alternating current, and more particularly to a novel impedor for obstructing flow of current circumferentially of the tubing so that the current is concentrated in the edges to be welded.

In the formation of electric resistance welded tubing, flat strips of skelp are progressively formed into an open tube sheet and the adjacent edges of the skelp are progressively welded together. Inside and outside bead trimmer devices are used to trim the internal and external beads or flash from the welded joint, as the joint is progressively welded, to produce a tube having smooth inner and outer surfaces.

When the weld current is either direct current or alternating current of a relatively low frequency, such as 60, 120, or 180 cycles, the edges of the tubing are forced into contact as they pass beneath rotary welding electrodes engaging the tubing on each side of the converging edges thereof and substantially at the point or zone of contact of the edges. With direct current or such relatively low frequency alternating current, the current follows the path of least resistance, which is the path between the electrodes across the abutted edges. Thus, there is substantially no current flow circumferentially of the tubing and the entire current flow is concentrated in the tubing edges.

However, when a radio frequency current, of the order of 450 kc., is used, the current flow conditions are different. In the case of currents of this frequency, the current follows the path of minimum reactance rather than the path of minimum resistance. Accordingly, in this case, the current is applied by rotary or sliding contacts to the opposite edges of the converging gap between the tubing edges and upstream of the point of contact of these edges, which point is in the common axial plane of the squeeze rolls. The current, following the path of least reactance, flows along one edge of the gap to the welding point, across the contacting edges, and upstream of the other edge. By virtue of the pronounced "skin effect" characteristic of current flow at radio frequencies, the heating effect of the current is largely concentrated in the edge surfaces of the tubing, permitting effective welding at very high speeds.

There is, however, another, or "back current," path between the edges of the gap in the partly formed tubing, this path extending circumferentially from one edge of the gap around the back of the tubing to the other edge of the gap. The amount of current flowing along this "back current" path is dependent upon the relative reactance of the "back current" path as compared to that of the path extending along the edges of the gap. The higher the relative reactance of the "back current" path, the greater will be the proportion of the input current flowing along the edges of the gap to the welding zone.

As the current flowing along the "back current" path circumferentially of the partly formed tubing is ineffective in the welding operation, it is desirable to reduce the "back current" to as near zero as possible by obstructing current flow along the "back current" path.

The ideal obstruction to the flow of "back current" would be a slot lengthwise of the tube and spaced preferably 180 degrees from the gap in the partly formed tube, but this is impractical where the end product desired is a complete tube. Accordingly, a practical impedor consists of material of relatively high magnetic permeability positioned close enough to the "back current" path so as to decrease the reluctance of this path and coincidently increase its reactance.

In addition, the material of the impedor must be of such nature that it will not be subject to high eddy currents and hysteresis losses which, at high frequencies and heavy currents, could heat the impedor above its Curie point (at which point a material loses its magnetic properties) or could even heat the impedor to its melting temperature.

A suitable material essentially meeting these conditions is powdered iron, which may be the type bonded by a resin but preferably is the type bonded by sintering in a furnace. In using an impedor of this material, it must be kept cooled to a temperature below its Curie point by circulation of coolant thereover at a relatively high velocity.

The construction of an impedor to incorporate the cooling arrangement presents difficulties, particularly in the case of an impedor designed for use in the welding of small diameter tubing, such as ¾" tubing, for example. Other difficulties are encountered due to the necessity of supporting both the impedor and an inside bead trimmer from a support extending inside the partly closed tubing through the gap upstream of the welding zone, with the bead trimmer being downstream of the welding zone and the impedor at least partially upstream thereof.

Generally, the bead trimmer is connected to the end of a relatively long rod extending downstream of the tube from the aforementioned support to beyond the welding point. With the impedor also supported on the rod, at least that portion of the rod upstream of the welding point, as well as the impedor, forms part of the magnetic material determining the reluctance and reactance of the "back current" path.

In accordance with the invention, a combined inside bead trimmer support and impedor assembly is provided in which the impedor effectively furnishes the requisite reluctance to increase the reactance of the "back current" path to a value high enough to assure substantially all the input current flowing along the gap edges to be welded while, at the same time, the impedor is adequately cooled to maintain it below its Curie point. Moreover the arrangement provides for adequate connection of a bead trimmer in operative relation in the tubing.

More particularly, the impedor assembly includes a coolant inlet pipe extending along the partly closed tubing and having its downstream end connected into an enlarged socket of bronze on the upstream end of an elongated bronze support rod arranged to be connected to an inside bead trimmer down-stream of the squeeze rolls or welding zone. The junction of the socket with the main body of the rod is formed as a frusto-conical shoulder having multiple ports therethrough. An impedor tube of bonded iron powder is telescoped on the support rod and has a bevelled or frusto-conical end abutting such shoulder, and longitudinal grooves spaced uniformly of its external periphery. This impedor tube extends partially downstream beyond the squeeze rolls.

A fiber glass sleeve covers the impedor tube and is anchored over the outer surface of the socket. The assembly further includes an upstream guide shoe in the form of a ring of dielectric material having good bearing and wear properties. This guide shoe is telescoped on the inlet pipe against the socket and is anchored to the inlet pipe. The upstream guide shoe has an outer diameter substantially equal to or slightly less than the inner diameter of the tubing.

A downstream guide shoe, of the same material as the upstream guide shoe, is provided in the form of an annulus anchored to the rod and abutting the downstream end of the impedor tube. This downstream guide shoe has longitudinal grooves uniformly spaced around its outer periphery, and has an outer diameter of the order of the inner diameter of the completely formed tubing. The downstream guide shoe is spaced substantially from the free end of the fiber glass sleeve.

Coolant under pressure, supplied to the inlet pipe, is directed through the ports in the frusto-conical shoulder to provide an annular high velocity stream of coolant between the impedor tube surface and the fiberglass sleeve, to maintain the impedor tube temperature below its Curie point. The discharged coolant flows through the peripheral grooves of the downstream shoe.

For an understanding of the invention principles, reference is made to the following description of a typical embodiment thereof as illustrated in the accompanying drawing.

In the drawing:

FIG. 5 is an enlarged axial sectional view of a tube illustrating an alternate arrangement of the impedor assembly embodied in the invention.

FIG. 6 is a diametrical sectional view taken on line 6—6 of FIG. 5.

Figure 1:
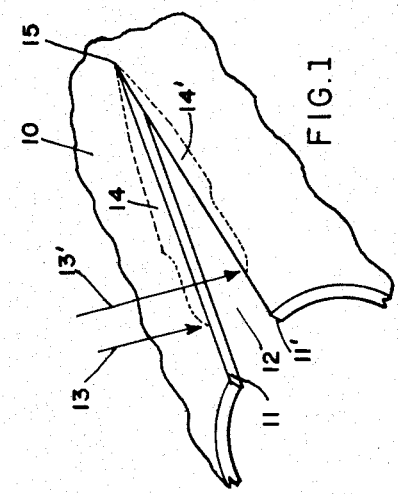
FIG. 1 is a partial perspective view of a tube being resistance welded with radio frequency current, and illustrating the path of flow of the current along the edges of the gap.

Referring to FIG. 1 of the drawings, tubing 10 is illustrated as being welded with radio frequency welding current of the order of 450 kc. In the manufacture of tubing 10, an elongated piece of skelp is progressively formed into a tubular shape as it is fed through forming roll stands (not shown) toward a welding stand. As the tubing is thus progressively formed, the edges 11, 11' of the skelp eventually define a V-shape gap 12 having its apex at a pressure roll stand where the edges 11, 11', heated to a welding temperature by the flow of electric current, are forced together under pressure to form a resistance welded seam.

The current is introduced at points 13, 13' spaced upstream from the apex 15 of gap 12, which apex is substantially in the common axial plane of the pressure rolls. The major part of the current flows toward apex 15 along edges 11, 11' to a depth indicated by the zone 14, 14' delineated by broken lines, and across the apex 15 of gap 12. While this is the path of least reactance, nevertheless some current flows circumferentially through the tube metal between points 13, 13' and zones 14, 14'. This current is extraneous to the welding operation and represents an actual loss insofar as welding is concerned. If all the current could be concentrated in the edges 11, 11' and zones 14, 14', either the total current input could be reduced substantially or, and preferably, the welding speed could be increased substantially. The impedor assembly embodying the invention is designed to effect such concentration in an efficient manner while also supporting an inside bead trimmer against longitudinal movement.

Figure 2:
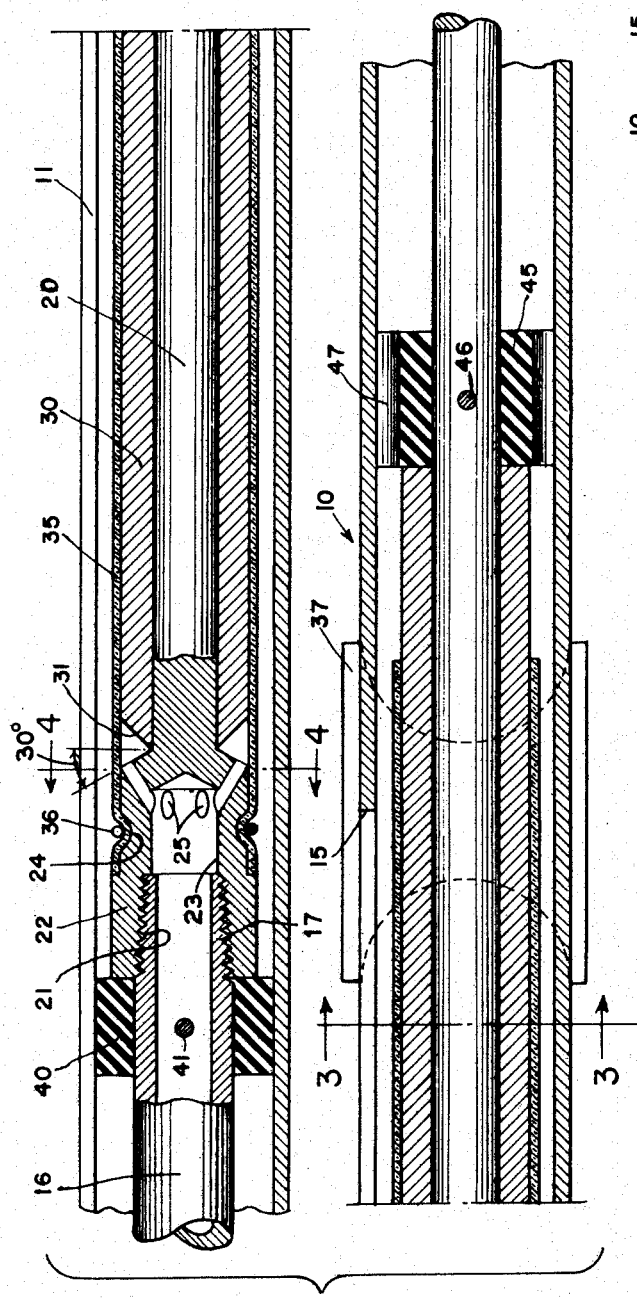
FIG. 2 is an enlarged axial sectional view of a tube illustrating the impedor embodying the invention.

Referring to FIGS. 2 and 5, the impedor and the inside bead trimmer assembly are connected to a fixed upstream support through the medium of pipe 16, preferably of stainless steel or other corrosion and heat resistant metal. In FIG. 2 pipe 16 has a reduced, tapered and threaded downstream end 17 which is threaded into a tapered and threaded seat 21 at the upstream end of an enlarged socket 22 formed on the upstream end of a bronze rod 20 connected to the inside bead trimmer assembly shown in FIG. 5.

Figure 4:
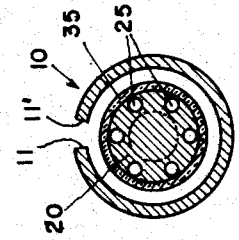

For a purpose to be described, socket 22 is reduced in diameter downstream of seat 21, as at 23 and formed with a circumferential groove 24 in the reduced diameter portion. The junction of socket 22 to the body of rod 20 forms a frusto-conical shoulder at a preferred angle of 30 degrees to the diameter of the rod, and this shoulder has a plurality of ports 25 formed therethrough at right angles to the face of the shoulder, as shown in FIGS. 2 and 4.

Figure 3:
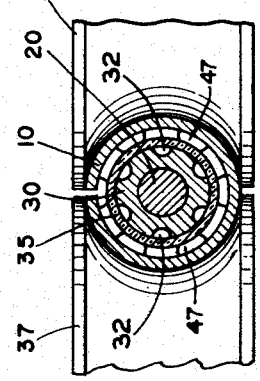
FIGS. 3 and 4 are diametrical sectional views on the correspondingly numbered lines of FIG. 2.

The impedor comprises a tube 30 of suitable material of high magnetic permeability, such as bonded powdered iron, telescoped over rod 20. The upstream end of tube 30 is bevelled at a preferred angle of 45 degrees, as at 31, and the peripheral surface of the tube 30 is formed with longitudinally extending, uniformly circumferentially spaced grooves 32 as best seen in FIG. 3. A suitable material for impedor 30 is that known as "Ferramic."

Impedor tube 30 is covered with a fiberglass sleeve 35 drawn thereover and held in position by a split wire clamp ring 36 depressing sleeve 35 into groove 24 of socket 22. Sleeve 35 extends along tube 30 to somewhat beyond the welding zone where the tube edges 11, 11' are forced together by pressure or squeeze rolls 37.

The impedor assembly and bead trimmer support is guided in the partly formed tubing by a cylindrical sleeve 40, having a diameter substantially equal to the inner diameter of tubing 10, secured to pipe 16 against the end of socket 22 by a pin 41. Sleeve 40 is molded of a suitable synthetic resin dielectric material such as "nylon."

The downstream end of the assembly is guided in the completed tube by a cylindrical sleeve 45 secured to rod 20 by a pin 46. Sleeve 45 also engages the end of impedor tube 30 to hold this tube positioned against the shoulder at the junction of socket 22 and rod 20. Sleeve 45 is formed with longitudinal grooves 47 spaced uniformly around its external periphery, and has an outer diameter substantially equal to the inner diameter of completely formed tubing 10.

In operation, water, oil, or other coolant is supplied under pressure to pipe 16 and is discharged through ports 25 to form a high velocity annular stream of coolant flowing between impedor tube 30 and fiberglass sleeve 35. This coolant stream adequately cools the impedor tube below the Curie point of its material. The coolant flows out the end of sleeve 35 and through the grooves 47 of guide bushing or sleeve 45 into the completely formed tubing. The coolant drains out of the tubing 10 as the latter is cyclically severed into individual lengths.

Referring to FIGS. 5 and 6, which show an alternate arrangement of impedor assembly, like reference numbers will be used to identify similar components previously disclosed in FIGS. 1 through 4. The enlarged connector socket 51, preferably of bronze, interconnects the pipe 16 and bronze support rod 20, such connection being effected by the tapped, threaded end 17 of pipe 16 in seat 21 at the upstream end of the socket and the tapped, threaded end 53 of rod 20 in seat 54 at the downstream end of the socket, respectively.

The socket 51 is reduced in diameter downstream of seat 21, as at 59. Intermediate the seat 54 and the seat 21 a frusto conical shoulder 55 is disposed at a preferred angle of 25 degrees to the diameter of the rod. The shoulder contains a plurality of ports 56 formed therethrough, at right angles to the face of the shoulder.

The impedor tube 60, of high magnetic permeability material, as for example bonded powdered iron known as "Ferramic," is telescoped over rod 20. The upstream end of tube 60 is beveled at a preferred angle of 45 degrees as at 61, with the peripheral surface of the tube coaxially spaced from the silicone rubber or fiberglass sleeve 65.

Impedor tube 60 is covered by the sleeve 65, drawn thereover and held in place by a split wire clamp ring 36 depressing sleeve 65 into groove 24 of socket 51, the sleeve 65 extending along tube 60 to a point somewhat beyond the welding zone.

The impedor assembly is guided at the upstream end by cylindrical sleeve 40 as before described. The downstream end of the assembly, within the completed tube, is guided by cylindrical sleeve 63, secured to rod 20 by a pin 62. Sleeve 63 also engages the end of the impedor tube 60 to position it relative to rod 20 and socket 51. The sleeve 63, molded of a suitable synthetic dielectric such as "nylon," is formed with longitudinal grooves uniformly spaced around its semicircumference and has an outside diameter substantially equal to the inside diameter of the completely formed tubing 10. Spacer 66 telescoped on rod 20 serves to position the inside bead trimmer assembly 68 with respect to sleeve 58 and the associated impedor tube 60.

In operation, water, oil or other coolant is supplied under pressure to pipe 16 and is discharged through ports 56 as a high velocity annular stream of coolant, flowing between the shoulder 55 and the fiberglass sleeve 65, through the annular space formed by the socket 51 and the adjacent sloping surface 61 of the impedor 60, thence through the annulus 57 formed by the impedor tube 60 and sleeve 65. The coolant stream adequately cools the impedor tube so its temperature will remain below the Curie point of the material. The coolant flows out the end of annular space 57, passes through annulus formed by the impedor tube and the completely formed tube 10 thence through the grooves in sleeve 63, the annular flow channel 67, around the bead trimmer 68, finally draining from the tubing 10 as it is cyclically severed into individual lengths.

In practical applications, the impedor tube 30 provides sufficient paramagnetic material to increase the reactance of the "back current" path to a value such that the current is concentrated along edges 11, 11′, and the welding speed has been substantially doubled. The presence of the bronze support rod 20 does not appear to affect the impedor action to tube 30.

While a specific embodiment of the invention has been shown and described in detail to illustrate the application of the invention principles, it will be understood that the invention may be embodied otherwise without departing from such principles.

What is claimed is:

1. In apparatus for progressively forming tubing by electric resistance welding utilizing radio frequency current, an impedor assembly comprising, in combination, a relatively elongated rod of electrically conductive non-magnetic material; a tube of material of high magnetic permeability telescoped on said rod; a sleeve of heat resistant dielectric material telescoped over said tube and secured to said rod; means for directing coolant under pressure in a high velocity stream over at least a portion of the surface of said tube inside said sleeve; and guide means secured at spaced positions to said rod and contacting with the tubing to maintain said rod substantially centrally aligned within the tubing.

2. In apparatus for progressively forming tubing by electric resistance welding utilizing radio frequency current, an impedor assembly comprising, in combination, a relatively elongated support rod of electrically conductive non-magnetic material, having an enlargement at its upstream end formed with a socket, the shoulder at the junction of said enlargement and said rod being bevelled and formed with ports therethrough; a tube of bonded pulverulent material of high magnetic permeability telescoped on said rod, said tube having a bevelled end abutting said shoulder and forming therewith an annular V-shaped recess; a sleeve of heat resistant dielectric material telescoped over said tube and secured to said enlargement; a conduit secured in said socket for supplying coolant under pressure to said socket for flow through said ports to provide a high velocity coolant stream over at least a portion of the surface of said tube inside said sleeve, and guide means secured at spaced positions to said support rod to centrally align said rod relative to said tubing.

3. In apparatus for progressively forming tubing by electric resistance welding utilizing radio frequency, an impedor assembly comprising, in combination, a relatively elongated rod of electrically conductive non-magnetic material, having a socket at its upstream end forming a shoulder at the junction of said socket and said rod, said shoulder being bevelled and provided with ports therethrough; a tube of bonded pulverulent material of high magnetic permeability telescoped on said rod, said tube having a bevelled end adjacent said socket and forming therewith an annular recess; a sleeve of heat resistant dielectric material telescoped over said tube and secured to said socket; a conduit secured in said socket for supplying coolant under pressure to said socket for flow through said ports to provide a high velocity coolant stream over at least a portion of the surface of said tube inside said sleeve; a first guide means secured to said rod and abutting the downstream end of said tube to retain the latter against said guide; a second guide means secured to said conduit and engaging the upstream end of said socket; said guide means contacting with the tubing to maintain said rod substantially centrally aligned within the tubing.

4. In apparatus for progressively forming tubing by electric resistance welding utilizing radio frequency current; a combined impedor and support for an inside bead trimmer comprising, in combination, a relatively elongated rod of electrically conductive non-magnetic material for connection to an inside bead trimmer; a tubular impedor of bonded pulverulent material of high magnetic permeability telescoped on said rod intermediate the ends of the latter; a sleeve of heat resistant dielectric material telescoped over said impedor, secured to said rod and in cooperation with said impedor providing an annular flow path, and means for directing coolant under pressure in a high velocity stream in said annular flow path over at least a portion of the surface of said impedor inside said sleeve.

5. In apparatus for progressively forming tubing by high frequency electric resistance welding having an impedor assembly within and extending longitudinally of the tubing and including an elongated member of high magnetic permeability material extending throughout the welding zone and means for directing a cooling fluid over the outer surface of said elongated member to maintain said member at a temperature below its Curie point, the improvement which consists of having said elongated member of tubular form and arranged to surround a longitudinally extending non-magnetic support rod mounted in said impedor assembly, and a sleeve of heat insulating material surrounding said elongated tubular member and arranged to confine the flow of cooling fluid to the peripheral surface of said elongated tubular member.

6. In apparatus for progressively forming tubing by high frequency electric resistance welding having a combined impedor and support for an inside bead trimmer within and extending longitudinally of the tubing and comprising, in combination, a relatively elongated rod of electrically conductive non-magnetic material extending through and beyond the position of high frequency tube welding to an inside bead trimmer; a tubular impedor of material of high magnetic permeability telescoped on said rod intermediate the ends of the latter at the position of tube welding; a sleeve of heat resistant dielectric material telescoped over said impedor and secured to said rod; means for directing coolant under pressure in a high velocity stream over at least a portion of the surface of said impedor inside said sleeve, and means for maintaining said elongated rod centrally aligned within the tubing.

References Cited in the file of this patent

UNITED STATES PATENTS 2,833,910    Stanton _____ May 6, 1958

UNITED STATES PATENT OFFICE
CERTIFICATION OF CORRECTION

Patent No. 3,004,134                                  October 10, 1961

Ernst W. Allardt

It is hereby certified that error appears in the above numbered patent requiring correction and that the said Letters Patent should read as corrected below.

In the drawings, sheets 1 and 2, line 2, and in the heading to the printed specification, lines 2 and 3, for "IMPEDOR FOR USE ON A THERMATOOL WELDER", each occurrence, read -- IMPEDOR FOR HIGH FREQUENCY ELECTRIC RESISTANCE --.

Signed and sealed this 24th day of April 1962.

(SEAL)
Attest:

ESTON G. JOHNSON                                      DAVID L. LADD
Attesting Officer                                         Commissioner of Patents